Figure 5:
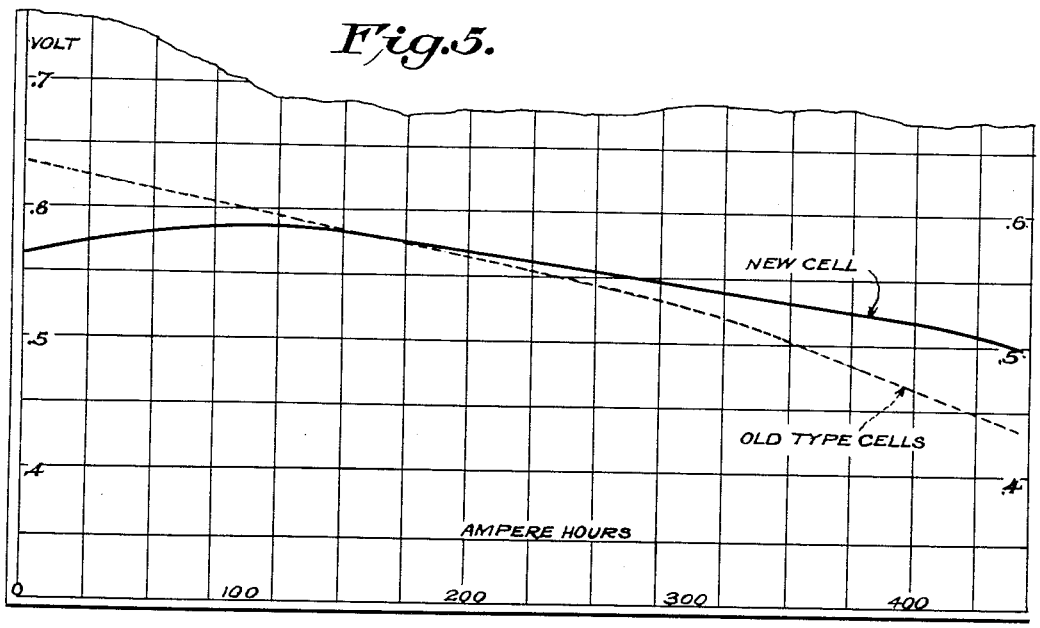

July 28, 1936.　　M. L. MARTUS ET AL　　2,048,804
PRIMARY CELL
Filed April 26, 1934　　2 Sheets-Sheet 1
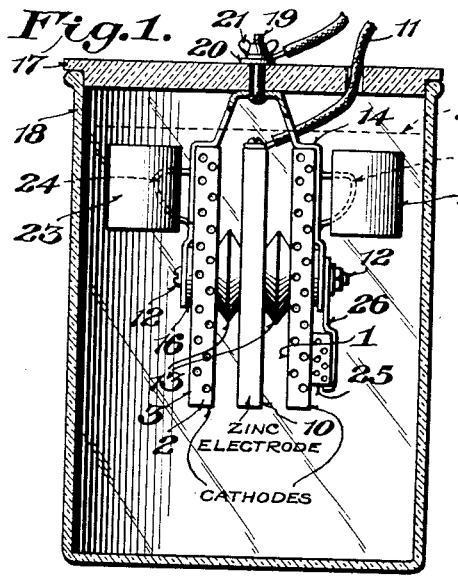
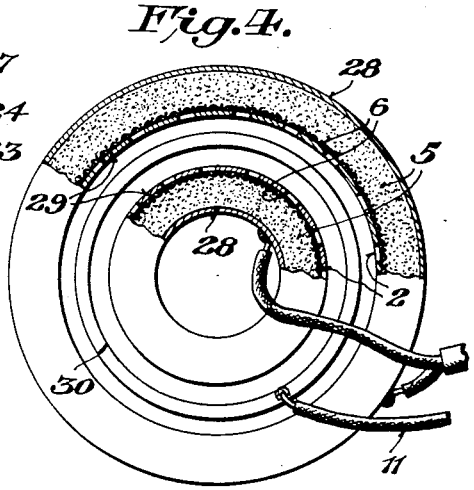
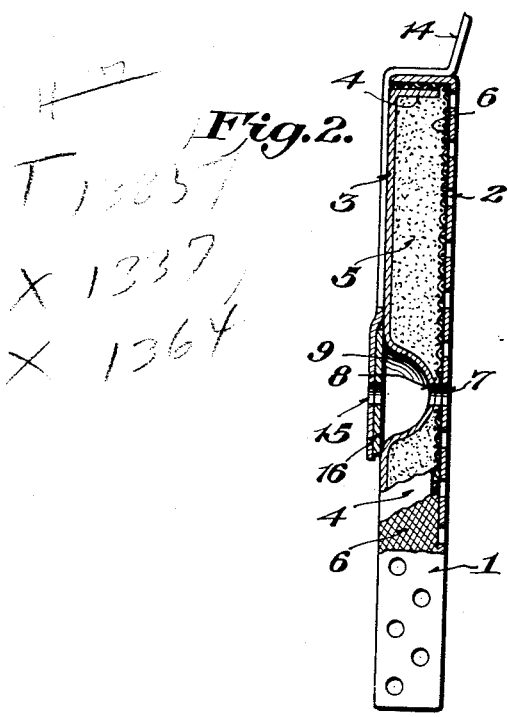
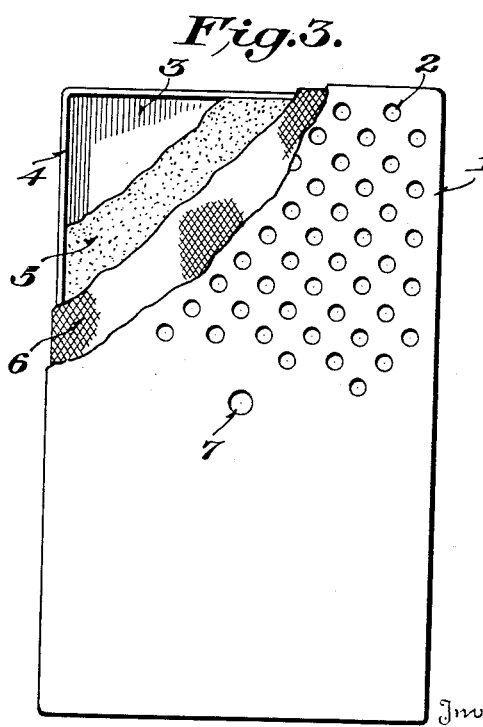
Inventors
Martin L. Martus,
Edmund H. Becker, July 28, 1936.   M. L. MARTUS ET AL   2,048,804
PRIMARY CELL
Filed April 26, 1934    2 Sheets-Sheet 2

Inventors
Martin L. Martus,
Edmund H. Becker,
By
their Attorney

Patented July 28, 1936

2,048,804

UNITED STATES PATENT OFFICE 2,048,804

PRIMARY CELL

Martin L. Martus, Woodbury, and Edmund H. Becker, Waterbury, Conn.

Application April 26, 1934, Serial No. 722,590

5 Claims. (Cl. 136—115)

This invention relates to primary cells; and it comprises an improved primary cell of the wet type adapted for use with an alkaline electrolyte; said cell comprising at least one zinc anode having an all-active surface in combination with at least one cathode also having an all-active surface closely adjacent the anode but spaced therefrom, said cathode, in the Lalande type cells of our invention, comprising a body of cupric oxide adapted to be exposed to the action of the electrolyte on the face closely adjacent the zinc anode and having an impervious metal backing member blocking off the face presented away from the anode; said cell having improved output voltage characteristics during discharge and a prolonged useful life; all as more fully hereinafter set forth and as claimed.

An object achieved in our invention, broadly stated, is the elimination of non-essential inactive plate surfaces by covering any such surfaces with a protective shield, thereby reducing local action, solubility, absorption, etc. and gaining advantages in conductivity, design, and cell construction heretofore not attainable. Our invention is particularly adapted to the production of improved Lalande type cells having longer shelf life, cleaner zinc surfaces and improved voltage characteristics upon discharge.

Primary cells of the modern wet cell type find extensive use in signal, telegraph and telephone work, where a thoroughly reliable and steady source of current is required at a comparatively low discharge rate. Formerly these cells were made with both active and inactive surfaces exposed to the action of the electrolyte and were restricted to closed circuit work, standing on open circuit being injurious to the cell. Cells made in accordance with our Patent No. 1,644,389 were apparently the first cells of this type to be manufactured for the purpose of delivering current after standing on an open circuit for long periods of time. The improved cells of our present invention are made even better able to withstand open circuit conditions, and to maintain a more uniform voltage.

We have found that the inactive faces of the plates in the ordinary cell are unnecessarily exposed to the chemical action of the active solution, causing excessive local action, and internal short circuits in Lalande type cells, and absorption of solution in the air-depolarizer carbon, zinc cells. According to the present invention we provide means to protect the inactive faces from the active solution and we limit the reaction zone to the space between the plates.

We have found that, in the Lalande type cells, (utilizing an alkaline electrolyte, a zinc anode and a copper oxide depolarizer, suitably spaced apart and mounted in a jar), local action, caused by copper dissolving in the solution, can be reduced to a minimum and better contact with the practically non-conductive copper oxide can be maintained by utilizing a conductive sheet of metal in contact with the outside surface of the copper oxide and a perforated metal facing separated from the oxide by means of a porous insulating material on the inside and active surface. This facing opposes a slab zinc anode amalgamated in the usual way. The metal backing is impervious sheet metal, advantageously copper, or iron copper plated, and the electrical connections for the cathode go to it. The electrolyte is in liquid communication with the copper oxide through the perforated face and porous insulating material, but is sealed away from it at the opposite or metal backed face. With this arrangement the copper oxide is electrically connected to the metallic back facing in the cell and externally to the cell terminal by means of a yoke and bolt suspension. We have found that this construction produces a cell having a voltage output which is more clearly constant over the life of the cell.

The Lalande type cells of the usual construction show a progressive drop in discharge voltage which may be ascribed to several effects. One of these effects is a progressive exhaustion of the electrolyte. The amount of caustic soda in the solution progressively decreases and moreover the reaction product (sodium zincate) is an inferior conductor. The internal resistance of the cell therefore increases with time. That this effect is appreciable can be demonstrated by the fact that the voltage of a half-discharged cell can be brought back to substantially its original value by replacing the partially exhausted electrolyte with fresh caustic soda solution.

There is another effect which tends to progressively increase the internal resistance of the usual Lalande type cell. The initial reduction of the cupric oxide always occurs along the face of the junction of the electrical conductor with the cupric oxide. If the cupric oxide is in contact with and surrounded by a perforated metal container which is electrically connected to the cathode terminal, the initial reduction of the cupric oxide naturally occurs along the inner face of the container adjacent the zinc anode. As the cell discharges the zone of reduction formed proceeds inwardly through the copper oxide leaving more or less spent cathode material, having an appreciable resistance, facing the zinc. The effective separation of the cathode and the active reduction zone thus increases with time until the end of the life of the cell. This occurs whether the cathode is located inside or outside the zinc electrode and the effect is more pronounced the thicker the copper oxide material.

In cells of our new design, cell reaction begins with reduction of the cupric oxide adjacent the metal backing of the cathodes. And as the cell is discharged, the effective reaction face moves forwardly through the copper oxide, parallel to the back, and towards the perforated facing adjacent the zinc anode, thereby gradually decreasing with time the separation of the cathodes and anodes via the electrolyte. The copper oxide offers an appreciable resistance to the passage of the current when the cell is first placed in operation which resistance is decreased with continued discharge of the cell. The increasing internal resistance of the cell due to electrolyte exhaustion is thereby substantially neutralized and the net voltage output of the cell is made practically steady. This construction is an improvement on our Patent No. 1,831,460.

In the new cell we find it advantageous to form the electrodes so that the body of zinc is surrounded over the greater portion of its area by the cathode or cathodes. The zinc electrode is most conveniently made, for practical reasons, in the form of a flat or curved slab or sheet, and we usually provide two cathodes, one opposing each face of the zinc electrode. It is sometimes convenient to provide a construction in which certain portions of the zinc electrodes do not directly face the cathodes. In these cases, any inactive faces of the zinc electrodes may be coated with insulating material such as pitch, rubber, or pitch protected by a thin sheet of hard rubber. These constructions provide an all-active zinc surface. When this construction is combined with the copper-backed cathode of the present invention, both electrodes have their inactive surfaces blocked off.

In all embodiments of the invention the construction of the anodes and cathodes is such that the active anode and cathode surfaces can be and are spaced from each other only a small distance. This makes for very low internal cell resistance and aids in securing uniform, high output characteristics.

An unexpected advantage is realized in the cell construction described. In the usual Lalande type cells particles of copper oxide become partially reduced during the course of the cell reactions and become detached from the cathode body, thereafter floating in the electrolyte; such particles having substantially the same density as the electrolyte. These particles gradually migrate over to the zinc electrode, depositing thereon with detrimental effects. Most of this deposition occurs on any inactive zinc surfaces. We have found that the impervious metal backed cathodes employed in our present invention combined with the all-active anode surfaces substantially prevent such action. There is a reduction of at least 50 per cent in the deposit of copper on the zinc electrodes. One cause for this is probably to be found in the construction of our new cathodes. It is evident that any partially reduced copper oxide particles, in order to reach the electrolyte, would have to pass, not only through the cloth layer 6, but also through the body of unreduced copper oxide. Our cathode construction therefore provides an increased cell life, a cleaner zinc surface and a better voltage characteristic during discharge.

Figure 6:
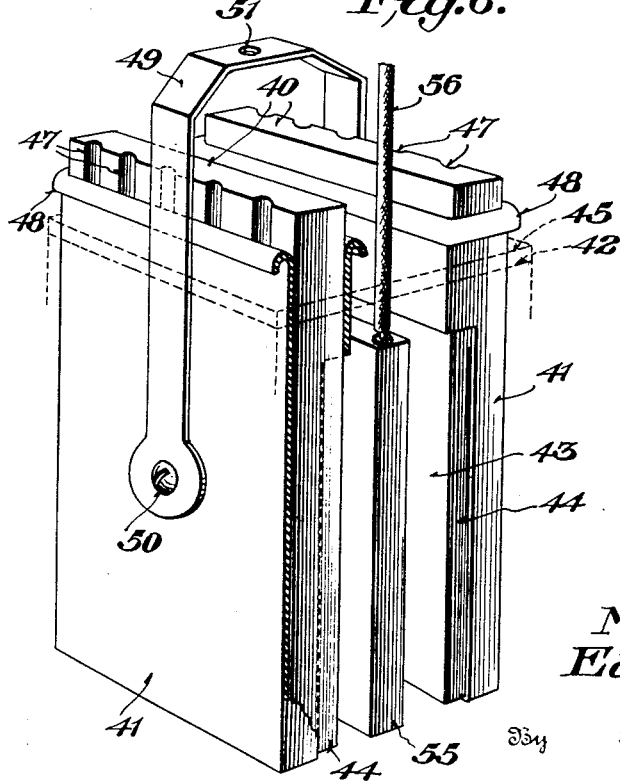

In the accompanying drawings we have shown, more or less diagrammatically, cells within the present invention. In these drawings, Fig. 1 is a view partly in elevation, partly in section, of one form of cell, Fig. 2 is a view partly in elevation, partly in section, of the cathode of this cell, Fig. 3 is a view in front elevation of the cathode of Fig. 2, with portions cut away, Fig. 4 is a sectional view of a modified electrode assembly comprising cylindrical electrodes, Fig. 5 is a chart diagramming the output voltage of our cell in comparison with the voltage characteristic of the usual type of cell, and Fig. 6 is a perspective view of an air depolarizer cell with portions cut away showing the means employed to protect the inactive surfaces of the carbon depolarizers from absorption of the solution.

Referring to the drawings, in which like reference numerals indicate like parts throughout, and first to Figs. 1 to 4 inclusive, Fig. 1 shows a cell comprising two cathodes each having a facing 1 perforated as at 2 and having a backing plate 3 of imperforate metal, advantageously of copper or copper plated iron, having the edges turned up as at 4. A body of granular cupric oxide 5 is enclosed between the facing and the backing, in contact with the backing and separated from the facing by means of a layer of preshrunk cloth 6, as shown. The cloth also separates the facing from the backing. The facing has an opening 7 and the backing has an opening 8 in a raised portion 9, to allow a bolt to be passed through the electrode.

The construction of the new copper-copper oxide cathode enables its manufacture in an extremely simple manner. The copper backing is usually stamped out of sheet copper, or of iron plated or sprayed with copper, in the form of a shallow tray. This may be laid flat and filled with copper oxide either in the form of a paste or of a powder. The cloth insulation is then placed over the copper oxide and the perforated facing is pressed down over the cloth and over the sides of the tray. The facing is in effect a top for the tray, the sides of the facing registering with the sides of the tray with the cloth therebetween, held firmly and smoothly in place by the edges of the metal of the facing.

The carbon cathodes of our invention may be made in substantially the same manner. The carbon can be pressed directly into an impervious backing member in the shape of a shallow tray. It will thus be seen that the cathodes of our invention may take the form of a shallow tray, impervious to the electrolyte and containing a compressed block of electrode material. In the case of the Lalande type cell the block of copper oxide advantageously, but not necessarily, is covered with a layer of preshrunk cloth.

As shown in Fig. 1, a slab-like zinc electrode 10 having a wire connection 11 to service is positioned between two opposed cathodes and spaced closely with respect thereto. The zinc is held in spaced relation to the cathodes by means of a tie bolt 12 passing through the three electrodes, and separators 13 advantageously of porcelain. The electrode assembly is carried on a yoke 14 having perforations 15 through which the tie bolt is passed. Washers 16 are interposed between the lower ends of the yoke and the bolt and nut, as shown. The electrode assembly is suspended by means of a yoke from the top cover 17 of a cell jar 18, the yoke being fastened to the top cover by means of a bolt 19 and nut 20. A wing nut 21 is provided, as shown, for attaching wires. This is the positive connection for the cell.

The cell illustrated is of the "add water" type, adapted to be stored in dry condition and to function immediately upon addition of water. Our Patent No. 1,579,558 was the first copper oxide cell of this type. The present design represents a considerable improvement over this previous patent; our present invention giving practically a straight line performance with this type of cell. As shown, a supply of caustic alkali is provided in the form of two blocks of solid caustic 23 carried on the yoke by means of metal hangers 24 embedded in the caustic. A supply of sealing oil is provided in absorbent material enclosed in a foraminous shell 25 attached to the yoke by a metal hanger 26, as shown.

In putting the cell into operation it is merely necessary to remove the seal from the solid caustic, secure elements to cover, add water to the proper level, indicated at 27, insert elements in the jar and connect the cell to service.

In Fig. 4 we have shown a modified type of electrode assembly comprising two concentric copper oxide cathodes of hollow cylindrical form, spaced from each other a small distance, and a zinc electrode positioned between, as shown. Each cathode comprises a cylindrical impervious backing member 28, a body of copper oxide 5, separators 6 of cloth, and perforated cylindrical facing members 29. The zinc electrode is in the form of a cylinder 30 as shown. This type of assemblage functions similarly to the flat electrode type. It presents certain advantages on account of its compactness. It is mounted in a cell by ordinary mounting means, not shown.

In these embodiments two factors cooperate to secure uniform high output characteristics. One is the metallic backing plate feature, the plates giving good electrical contact for the copper oxide masses. The other is the close spacing between anode and cathode. The shallow tray-like construction of the cathodes makes possible unusually close spacing, with consequent diminishment of internal cell resistance. This is in every way advantageous.

Assuming that the cell of Fig. 1 has been put into operation by adding water to the jar and connecting the cell into a circuit, the cell will discharge until completely exhausted. In a cell of usual dimensions, this usually occurs after about 500 ampere-hours of electricity have been drawn from the cell.

Fig. 5 is a graph showing the voltage characteristics of a cell of the old Lalande type, and of the new cell. The voltages are plotted as ordinates against output of the cell in ampere-hours, as abscissas. Both cells were of the same equivalent dimensions, and were discharged at the same rate. The discharge curve for the old type cell (broken line) shows a gradual decrease from an initial value of around 0.64 volt to a value of 0.50 volt at 350 ampere hours. Inasmuch as it is customary in the use of Lalande type cells to consider the useful life of a cell to be completed when the discharge voltage falls to 0.50 volt, the useful life of this cell must be taken as 350 ampere hours, although the voltage drops rapidly and the cell continues to give current after this point has been reached.

The solid line in the chart shows the discharge curve for the new cell. The output voltage is somewhat lower, at the beginning, than is an ordinary cell, being around 0.57 volt. The voltage rises to a maximum of about 0.59 volt after around 100 ampere hours of electricity have been discharged, and then falls off gradually. The voltage drops to 0.50 volt only after 440 ampere hours discharge. It is seen that the voltage is much more constant than in older type cells, and, what is of equal importance, the useful life was 26 per cent longer than in ordinary type cells, although the drain in both cases was quite heavy namely 3 amperes.

The curves shown are by way of example, and the numerical values may differ in cells having different spacing of electrodes, and different dimensions, but the output characteristics of the new cells are of the same general nature as that illustrated in the graph.

In Fig. 6, I have shown a modified cell assembly, carrying further the sealing off of inactive surfaces of electrodes. As shown, the assembly comprises two similar activated carbon depolarizing cathodes, each comprising a block 40 of compressed activated carbon. Each block is surrounded over most of its surface by a rubber sheath 41, as shown. In use, the assembly is advantageously mounted in a rectangular cell jar (not shown) and electrolyte is used in amount sufficient to come to the level indicated at 42. The sheath 41 leaves exposed below the electrolyte level 42 only the inner flat faces 43, and a narrow edge portion 44, of each block, as shown.

In use, the solution carries on its surface a thin layer of oil to prevent evaporation, indicated at 45. The upper portion of the sheath 41, which encircles each carbon block as shown, serves to prevent the oil from contacting the carbon. An adhesive such as pitch, asphalt, etc. is used between the sheath and the carbon, to insure against penetration of electrolyte into the inactive portions of the electrode. As shown, the carbon blocks are provided with vertical grooves 47, putting the lower portions of the block in communication with the air. The rubber sheath 41 terminates below the upper edge of the blocks, advantageously in a rolled edge 48 to insure against creepage, and the upper portions of the blocks are freely exposed to the air, as shown. The cell jar cover (not shown) is provided with openings for air.

The carbon blocks are carried on a metal yoke 49 by means of bolt 50 making electrical contact with both the yokes and the carbon. The yoke is perforated as at 51 for bolting the yoke to the cell jar cover. Electrical connection from the cathode is taken from the yoke. A zinc electrode 55 in the form of a slab, as shown, is mounted between the carbon blocks by means of the bolt 50, insulating washers (not shown) being interposed between the zinc and the carbon similarly to the arrangement in the embodiment of Fig. 1. Electrical connection with the zinc electrode is made through an insulated wire 56.

In some cases it is desirable to make the carbon and zinc electrodes in cylindrical form as in the embodiments shown in Fig. 4; but the construction illustrated is cheap and convenient. This structure is also adapted for use with a copper-copper oxide cathode. The sheath may be made of fiber or the like instead of rubber.

Other modifications of the cells of our invention are sometimes advantageous. For instance, to construct a Lalande type cell capable of delivering higher discharge rates and where long life is not essential we insert a conductive sheet of wire cloth between the oxide surface and cloth, and electrically connected to the protective sheet and terminal of the cell, thereby having the effect of doubling the conductive surface of the copper oxide depolarizer.

The electrode assembly may take the form of a central zinc rod, or a hollow sheet metal cylinder having the interior sealed from access of electrolyte; and a single cylindrical cathode surrounding the zinc. In this assembly as well as in those illustrated in the drawings, the exposed surface of the zinc is surrounded by the cathode surface and deposition on the zinc is prevented.

In that cell construction wherein the electrode assembly takes the form of a central copper oxide plate and two zinc plates, exposing inactive zinc surfaces, we apply an impervious coating of pitch, sheet rubber or both to the outside surfaces of the zinc plates. Of course cells having a plurality of plates are within the scope of the present invention. In such cells the electrodes have their inactive surfaces blocked off as described.

It will be seen that the present invention provides a cell having improved discharge characteristics, and longer useful life, for the same equivalent size and weight of electrodes and amount of electrolyte. The advantages gained by our improved construction when cells are used as a reserve battery are much greater than when the battery is discharged continuously as shown in the chart.

What we claim is:—

1. In a Lalande type cell employing a caustic alkaline electrolyte and a zinc anode, an improved cathode comprising an impervious metal backing member, a perforated facing member, the two said members cooperating to define an enclosed chamber, a body of copper oxide in the chamber between the two said members and in electrical contact with the backing member, pervious insulating material between the copper oxide body and the facing member, and an electrical connection to the backing member.

2. An improved Lalande type cell having low internal resistance, a substantially constant output voltage during discharge and a prolonged useful life, said cell comprising two cathodes, a zinc anode and a caustic alkaline electrolyte, each cathode comprising an impervious metal backing member and a body of copper oxide in electrical contact therewith, means for mounting the zinc anode being mounted in closely opposed spaced relationship between the cathodes, the backing members being on the side of the copper oxide bodies opposite and away from the zinc, and an electrical connection to the backing members, so that cell reactions during discharge take place initially in a region adjacent the backing members and the region of reaction gradually approaches the zinc electrode.

3. An improved Lalande type cell having low internal resistance, substantially constant output voltage during discharge and a prolonged useful life, said cell having in combination a cathode comprising a conductive metal backing member and a perforated facing member cooperating with the backing member to define a chamber, a body of copper oxide enclosed within the chamber between the two members and in electrical contact with the backing member, a zinc anode of substantially the same shape as the cathode, means for mounting the zinc anode in close spaced relationship to the cathode, the perforated member of the cathode being nearest the zinc and the backing member being opposite from the zinc, means for separating and insulating the facing member from contact with the copper oxide and with the backing member, an electrical connection to the zinc anode and an electrical connection to the backing member, and a caustic alkaline electrolyte surrounding the anode and cathode, so that during discharge cell reactions take place initially in a region adjacent the backing member and the region of reaction gradually approaches the zinc electrode.

4. A cathode for a primary cell of the Lalande type comprising a shallow vertically disposed metallic tray-like container impervious to the electrolyte and having a flat back and turned up sides, copper oxide substantially filling the container and in electrical contact therewith, an electrical connection to said container, and a perforate cover member of substantially the same form as the container and having a front and sides, the sides registering with those of the container, the container and cover member enclosing the copper oxide between them.

5. The structure of claim 4 wherein a layer of cloth is interposed between the cover member and the copper oxide and the sides of the container.

MARTIN L. MARTUS.
EDMUND H. BECKER.

CERTIFICATE OF CORRECTION.

Patent No. 2,048,804.                                              July 28, 1936.

MARTIN L. MARTUS, ET AL.

It is hereby certified that error appears in the printed specification of the above numbered patent requiring correction as follows: Page 4, second column, line 3, claim 2, strike out the words "being mounted"; and that the said Letters Patent should be read with this correction therein that the same may conform to the record of the case in the Patent Office.

Signed and sealed this 29th day of September, A. D. 1936.

Henry Van Arsdale (Seal)                                              Acting Commissioner of Patents.